Oct. 21, 1930.  W. F. WIRGMAN, JR., ET AL  1,779,385
VULCANIZING APPARATUS
Filed Sept. 14, 1926

INVENTORS
Wilbur F. Wirgman Jr.
BY Moses E. Tedrow.
R S Jrogner
ATTORNEY

Patented Oct. 21, 1930

1,779,385

UNITED STATES PATENT OFFICE

WILBUR F. WIRGMAN, JR., AND MOSES E. TEDROW, OF AKRON, OHIO, ASSIGNORS TO THE GOODYEAR TIRE & RUBBER COMPANY, OF AKRON, OHIO, A CORPORATION OF OHIO

VULCANIZING APPARATUS

Application filed September 14, 1926. Serial No. 135,337.

Our invention relates to apparatus for vulcanizing pneumatic tire casings and it has particular reference to a mold including an inflatable container adapted to support the casing while effecting a repair therein.

It is often desirable to repair a pneumatic tire casing by applying a new tread portion thereto, and this operation is customarily performed in a mold that confines the outer surface of the tire, and which is provided with means to exert a radial outward pressure within the casing. Inflatable annular cores, or airbags, of circular cross-section, have frequently been utilized, and they have been supported within the tire casing by solid metal rims or bands of heavy construction.

Several unsatisfactory features have been observed when such means are used. A roughened surface is imparted to the side walls of the casing, due to the expansion of the bead portions of the tire around the inner edges of the tread mold. The use of such airbags often results in displacements of the tread with respect to the mold, and the design formed thereby is not symmetrically positioned. Furthermore, the apparatus heretofore employed is rather cumbersome and difficult to assemble, and hence the performance of the vulcanizing operation requires the expenditure of an undesirable amount of time and labor.

It is the primary object of the invention to provide an airbag, and a supporting member therefor, that shall be simple in construction, and with which repairs to a tire casing may be readily effected in a satisfactory manner.

Additional objects, and the advantages to be derived from a practice of the invention, will become apparent from a perusal of the following description of a preferred form of mold equipment, illustrated in the accompanying drawing, wherein.

Figure 3:
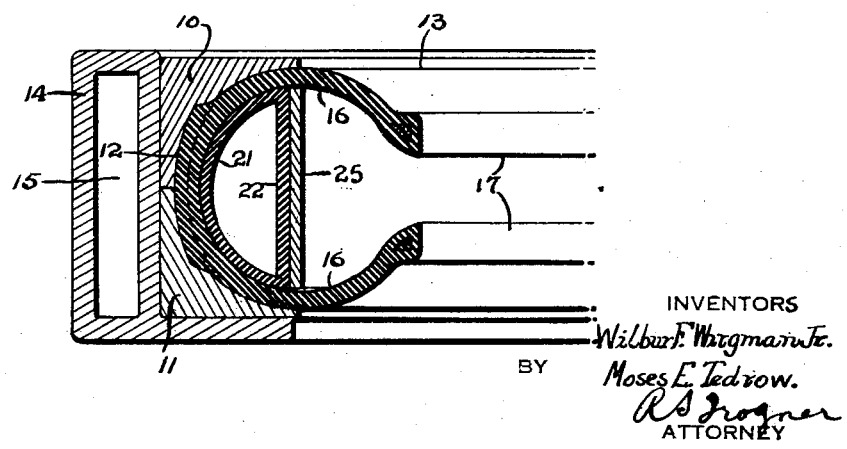
Fig. 3 is a fragmentary cross-sectional view of a vulcanizing apparatus having a pneumatic tire casing positioned therein.

As shown in Fig. 3, the molding apparatus comprises a plurality of annular mold sections 10 and 11, that are adapted to be assembled to enclose the tread portion 12 of a pneumatic tire casing 13. The sections 10 and 11 are confined within an annular member 14, that is provided with a steam chest 15 to permit the application of heat to the tread portion 12. The mold members 10 and 11 extend radially inwardly to enclose a portion of the side walls 16 of the casing 13, but the bead or toe portions 17 of the tire are unconfined.

An inflatable annular core or airbag 20, is positioned within the casing 13, and it is adapted to be expanded, by means of compressed air, steam, or other suitable fluid, to exert pressure upon the tread 12 in a radially outward direction. The airbag is provided with an outer arcuate wall 21 of substantially semicircular cross section, to conform to the shape of the tire casing, but the inner wall 22 is substantially straight in cross-section. The container 20 may be constructed of rubber or of rubber and cord or cross-woven fabric, to permit of the expansion of the outer wall 21, but preferably the inner wall 22 is reinforced against expansion by suitable means, such, for example, as the application of a strip of cross woven square cut fabric thereto.

A fluid container so constructed will expand uniformly over its toroidal surface, when properly positioned and inflated, to force the tire casing snugly against the mold sections 10 and 11. A "full circle" bag, that is, a bag having a complete annular form, is desirable for general retreading operations, but a segmental bag of the same cross-sectional contour may be employed for effecting localized repairs. The airbag is provided with a valve 23 that is secured in its inner wall 22, and to which may be attached a conduit 24 that is connected to a suitable fluid pressure reservoir.

The core 20 is supported by means of a mold member 25, that is adapted to be positioned within the inner periphery of the cylindrical wall 22. The supporting member 25 comprises a plurality of arcuate sections 26, 27 and 28, that are flexibly connected by means of hinge members 29 and 31, and which form a closed cylindrical rim or band when they are expanded to an operative position. The member 27 is provided with an aperture 32 for the reception of the valve stem 23. The section 26 is formed with a beveled end 33 that is adapted to be snapped over a similarly tapered end 34 of the adjacent ring section 28, to maintain the parts in distended relation. A latch 35 may also be provided to prevent accidental collapse of the member 25.

Figure 1:
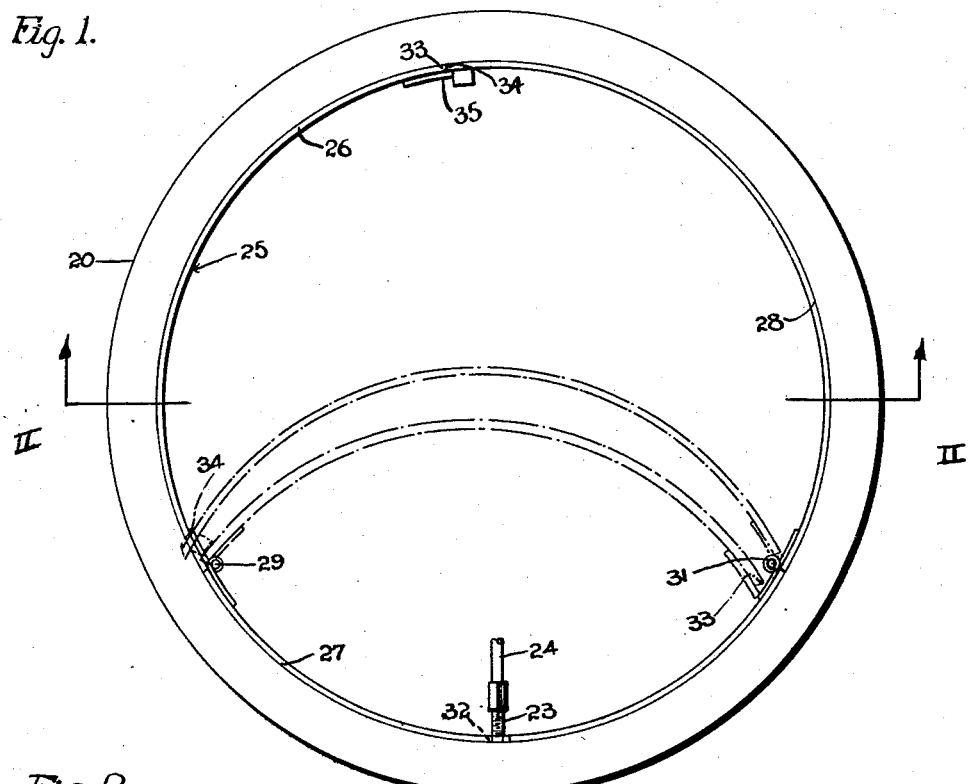
Fig. 1 is a side elevational view of an airbag and a supporting member therefor.
Figure 2:
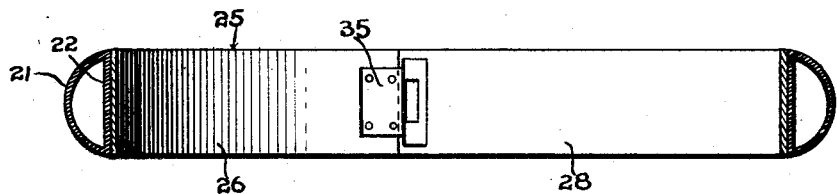
Fig. 2 is a cross-sectional view taken along the line 2—2 of Fig. 1.

The section 28 of the support 25 is slightly longer than the section 27, which, in turn, is of greater length than the section 26. This construction is desirable, as it permits the sections 28 and 26 to be swung inwardly without interference or binding, as indicated by the dot-and-dash lines in Fig. 1. This arrangement facilitates the assembly of the apparatus and it effects a desirable conservation of time and labor.

The airbag and its support are so dimensioned that the inner wall 22 of the core 20 is disposed wholly within the mold sections 10 and 11, and the inner periphery of the band 25 extends a slight distance radially inwardly therebeyond, as illustrated in Fig. 3. Unsightly marks or lines of overflow on the side walls 16 of the casing 13 are avoided when the parts are arranged in this manner, and there is less likelihood of displacements within the mold than would be the case if the support 25 were otherwise positioned.

In operation, a casing 13 is positioned within the mold sections 10 and 11, and the inflatable core is inserted within the tire. The supporting member 25 is so disposed within the core 20 that the section 27 contacts with the inner wall 22, and thereafter the sections 28 and 26 are distended to provide a continuous circular support. Inflating fluid is applied to the core 25 through the valve 23 and the vulcanizing operation is effected in accordance with customary practice. The core may be removed readily by releasing the inflating pressure, springing apart the ends 33 and 34 of the band 25, and allowing the support 25 to collapse under its own weight.

It will be seen that the invention provides a vulcanizing apparatus that may be utilized for repairing operations with a minimum expenditure of time and labor. While simple in construction, the apparatus is efficient, and it permits of repairs being made in a highly satisfactory manner. Those skilled in the art may resort to various modifications of the apparatus illustrated without departing from the principles of the invention, and hence it is desired that only such limitations should be imposed as are set forth in the following claims.

What we claim is:

1. An inflatable container adapted to be used with vulcanizing apparatus comprising a member having an outer wall arcuate in cross section and a cylindrical inner wall, the outer wall being expansible and the inner wall being substantially inexpansible under vulcanizing pressures.

2. A vulcanizing apparatus comprising an inflatable annular container formed with an outer wall semi-circular in cross section and an inner cylindrical wall, and an annular supporting band adapted to engage the inner wall of the container throughout its extent including a plurality of arcuate sections of unequal length and flexible connections between a plurality of the sections.

3. A vulcanizing apparatus for pneumatic tire casings comprising a plurality of mold sections adapted to enclose the tread portion of a tire, an inflatable container adapted to be positioned within the tire formed with an outer wall conforming to the contour of the inner surface of the casing and a cylindrical inner wall equal in width to the distance between the adjacent inner wall surfaces of the tire, and a collapsible support for the inflatable container, said support having an outer cylindrical wall equal in width to the width of the cylindrical wall of the container and contacting therewith.

4. A vulcanizing apparatus for pneumatic tire casings comprising a plurality of mold sections adapted to enclose the tread portion of a tire, an annular inflatable container adapted to be positioned within the tire and formed with an outer wall conforming to the contour of the inner surface of the casing and a cylindrical inner wall equal in width to the distances between the adjacent inner wall surfaces of the tire, and an annular collapsible support for the inflatable container, said support having an outer cylindrical wall equal in width to the width of the cylindrical wall of the container and contacting therewith.

5. A vulcanizing apparatus for pneumatic tire casings comprising a mold adapted to enclose the tread portion of a tire, an inflatable container adapted to be positioned within the tire, formed with an outer wall conforming to the contour of the inner surface of the casing and a cylindrical inner wall substantially equal in width to the distance between the adjacent inner wall surfaces of the casing, and a collapsible support for the inflatable container, said support having an outer cylindrical wall substantially equal in width to the width of the cylindrical wall of the container and contacting therewith.

In witness whereof, we have hereunto signed our names.

WILBUR F. WIRGMAN, Jr.
MOSES E. TEDROW.